(No Model.) 3 Sheets—Sheet 1.
W. A. LAIDLAW.
BALE TIE MACHINE.
No. 512,617. Patented Jan. 9, 1894.
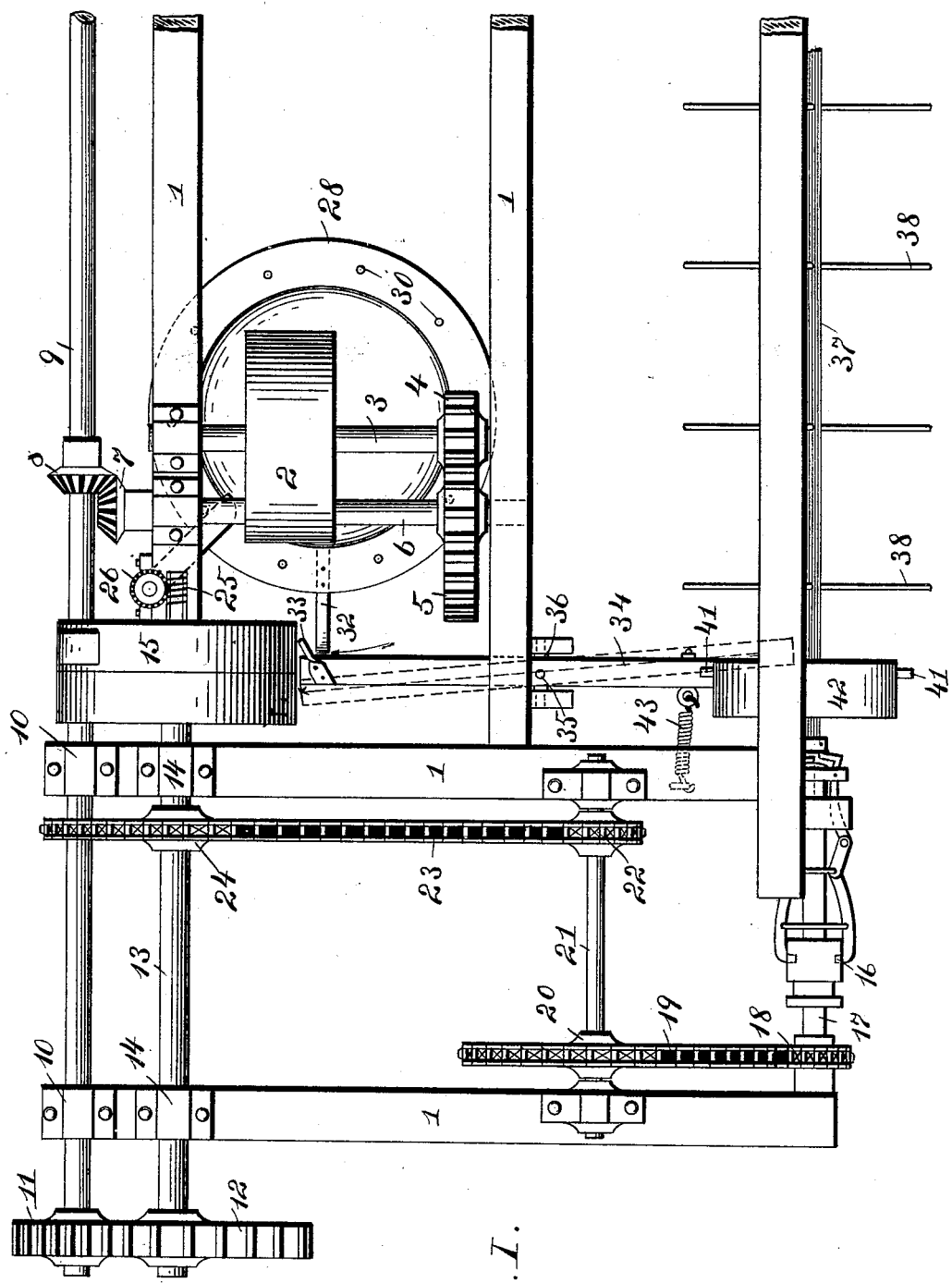
Fig. I.
Witnesses:
F. G. Fischer
Walter E. Allen
Inventor:
W. A. Laidlaw
By Wright Bros.
Attys (No Model.) 3 Sheets—Sheet 2.
W. A. LAIDLAW.
BALE TIE MACHINE.
No. 512,617. Patented Jan. 9, 1894.
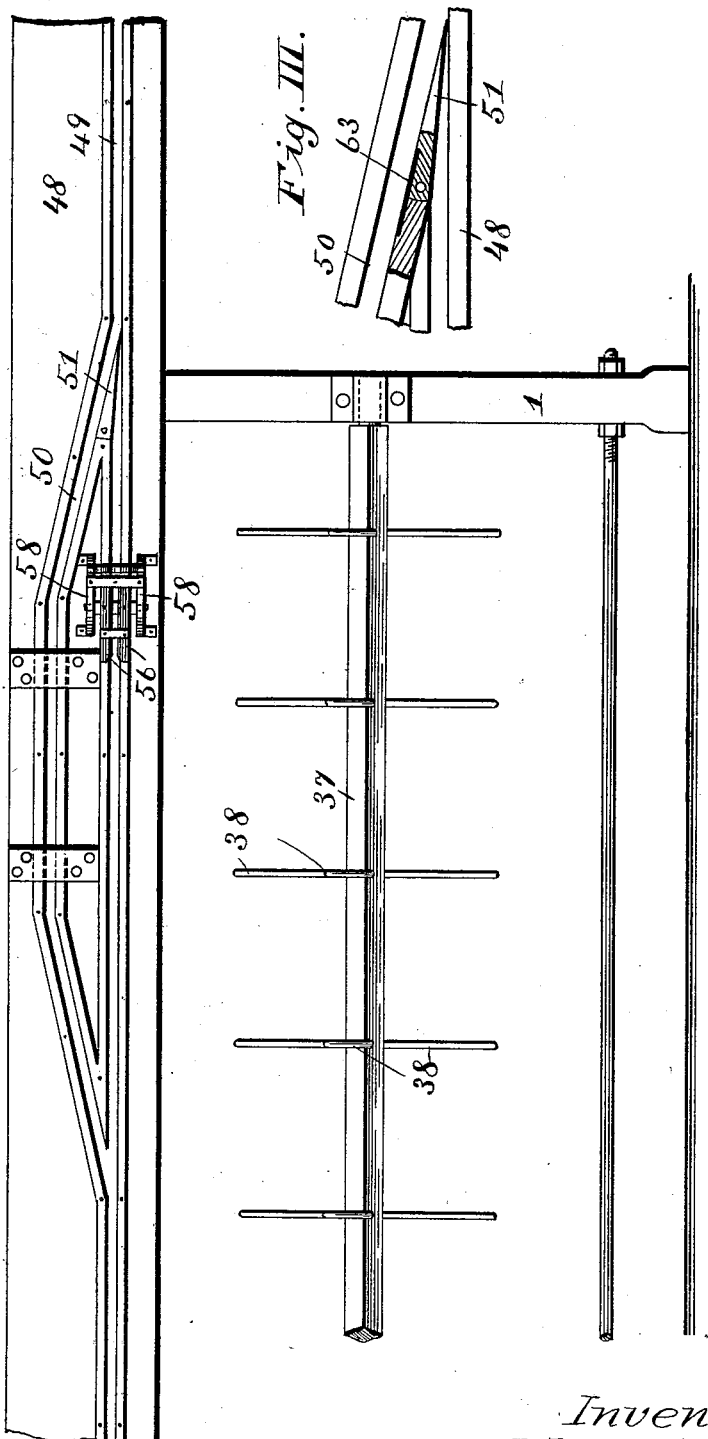
Witnesses:
F. G. Fischer
Walter E. Allen
Inventor:
W. A. Laidlaw
By Aught Bros. Attys.

(No Model.) 3 Sheets—Sheet 3.
W. A. LAIDLAW.
BALE TIE MACHINE.
No. 512,617. Patented Jan. 9, 1894.
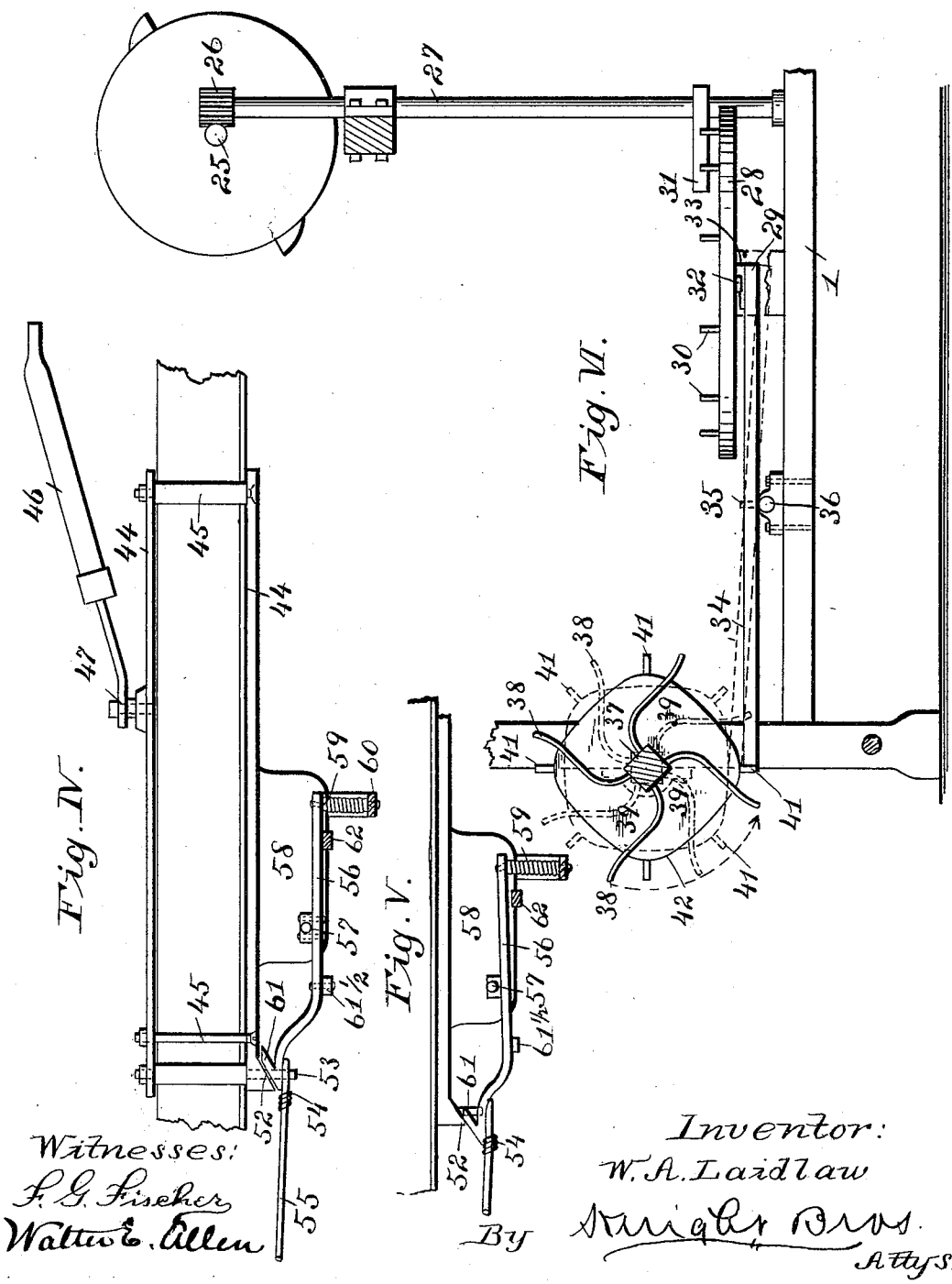
Witnesses:
F. G. Fischer
Walter E. Allen
Inventor:
W. A. Laidlaw
By Knight Bros.
Attys.

UNITED STATES PATENT OFFICE.

WILLIAM A. LAIDLAW, OF KANSAS CITY, MISSOURI.

BALE-TIE MACHINE.

SPECIFICATION forming part of Letters Patent No. 512,617, dated January 9, 1894.

Application filed February 6, 1893. Serial No. 461,230. (No model.)

*To all whom it may concern:*

Be it known that I, WILLIAM A. LAIDLAW, of Kansas City, in the county of Jackson and State of Missouri, have invented certain new and useful Improvements in Machines for Making Bale-Ties, of which the following is a full, clear, and exact description, reference being had to the accompanying drawings, which form a part of this specification.

My invention relates to certain new and useful improvements in machines for making bale ties, and more especially to an automatic counting device for counting the ties as they are manufactured, and means for discharging the ties from the loop-carrier; and my invention consists in certain features of novelty hereinafter described and pointed out in the "claims."

My present invention is for an improvement on my Patent No. 473,321, issued to myself on the 19th day of April, 1892.

Figure I is a detail plan view of my improved machine. Fig. II is a detail side elevation of a part of the same. Fig. III is an enlarged detail side elevation of the switch for governing the travel of the loop carrier. Fig. IV is an enlarged detail side elevation of the loop carrier and trip bar for disengaging the ties from the loop carrier. Fig. V is an enlarged detail side elevation of the loop carrier and trip for disengaging the bale tie from the carrier, showing the trip lever in the position it assumes when the bale tie is discharged. Fig. VI is an enlarged detail view showing the manner of operating the counting mechanism.

Referring to the drawings, 1, represents the frame of the machine by which the various parts are supported.

2, represents the power pulley for communicating motion to the machine, said pulley being mounted on a shaft 3, said shaft carrying a pinion 4, which meshes with a gear 5, on a parallel shaft 6; said parallel shaft being provided at its opposite end with a bevel gear 7, meshing with a bevel gear 8, on a shaft 9, the shaft 9, being journaled to the frame 1, as shown at 10, and having a pinion 11, on its opposite end, which meshes with a gear 12, on a parallel shaft 13, journaled to the frame 1, as shown at 14, said shaft 13, having on its opposite end a pulley or disk 15, the purpose of which is shown and described in my former patent referred to.

16, represents a twisting device, driven by a shaft 17, bearing a sprocket wheel 18, which in turn is driven by a drive chain 19, bearing on a sprocket 20, secured to a shaft 21, said shaft being driven by a sprocket 22, and drive chain 23, bearing on a sprocket 24, of the shaft 13; all of which is fully described in my patent before referred to.

In my present invention I extend the shaft 13, beyond the face of the pulley 15, and cut a worm thereon, as shown at 25, said worm meshing with a worm gear 26, secured to the upper end of a vertical shaft 27.

28, represents a disk rotating in a horizontal plane and pivoted to the frame 1, as shown at 29. The disk 28, is provided near its periphery with a series of pins or projections 30, equidistant from each other.

31 represents an arm on the vertical shaft 27, which upon each revolution of said shaft comes in contact with one of the pins 30, and rotates the disk 28, a certain distance. On each revolution of the disk 28, an arm 32, comes in contact with a bracket 33, on a pivoted lever 34, said lever being pivoted to a pin 35, said pin being secured and pivoted by a horizontal bearing or shaft 36, thus permitting of both lateral and perpendicular movement of the lever 34.

37, represents a rack bar extending lengthwise of the machine, said bar having a series of radial curved arms 38, thus forming sockets 39, between said arms, into which the bale ties 55, fall as they are discharged from the loop carrier in their perfected state. The weight of the bale ties would naturally compel the bar 37, with its arms to revolve, said bar or shaft 37, being prevented from revolving by the end of the lever 34, coming in contact with pins 41, secured to the heads 42, of the bale tie rack, there being four of said pins on said rack, the same number as the arms 38, whereby each revolution of the rack would discharge four bundles of bale ties. On each revolution of the disk 28, the arm 32, attached to the disk, coming in contact with the bracket 33, on the lever 34, will cause said lever 34, to assume the position shown in dotted lines, Fig. I, throwing the outer end of the lever 34, out of engagement with one of the pins 41, and permitting the shaft 37, or the rack which holds the ties to revolve one-fourth of the way around, thus discharging a bundle of completed ties and bringing another series of the curved arms 38, in position to receive a new bundle of ties. As soon as the arm 32, has passed out of engagement with the bracket 33, a spring 43, will return the lever 34, to its normal position; thus engaging the next pin 41, and stopping the revolution of the rack until the disk 28, has made one more revolution, caused by the arm 31, operating on the pins 30, on said disk. Thus I am enabled to automatically count the number of ties in each bundle, and automatically discharge the same from the rack into which they are dropped when said bundle has received the required number of ties, the lever 34, being pivoted, as before described, vertically as well as horizontally, permitting the outer end of said lever to bear against the head 42, of the receiving rack; thus forming a brake, and being at the same time in position to come in contact with the succeeding pin 41, said head 42, being made square so that the projecting pin will readily come in contact with the end of the lever 34.

My improved loop carrier consists of horizontal bars 44, connected by cross-bolts 45, having a link 46, connected therewith, as shown at 47, said link being connected with a suitable power, not shown, such as my driving chain shown in the aforementioned patent, whereby said loop-carrier is propelled to and fro, the loop-carrier traveling in the frame 48, provided with a central passage-way 49, and a switch-passage-way 50, having a switch 51, for automatically switching off the loop-carrier on its return trip, and allowing it to pass the other loop-carrier secured to the drive chain, the operation of which is described in the aforementioned patent. The outer bar 44, of the loop carrier is provided with a beveled end 52, through which extends a pin 53, over which the looped end 54, of the bale tie 55, passes and by which said tie is drawn forward by the loop-carrier.

56, represents trip arms pivoted at 57, to movable brackets 58, one end of said trip arm having a spring 59, connected therewith, the opposite end of said spring being secured to a bracket 60, whereby said trip arm has its rear end held normally in the path of the loop bar 44. The rear end of the trip bar 56, is beveled, as shown at 61, with which the beveled end 52, of the bar 44, comes in contact as the loop-carrier is forced forward, said beveled end of the bar 44, riding upon the beveled end of the trip bar, forcing the same outward, and thus forcing the loop 54, of the bale tie off of the pin 53, (see Fig. V) thus dropping the completed tie in the rack, the tie being severed from the body of the wire at the opposite end of the machine at the same time that the loop is thrown from the pin 53, the severing device being shown in the aforementioned patent. As soon as the beveled end 52, of the bar 44 has passed out of contact with the beveled end 61, of the trip bar, the trip bar returns to its normal position by the force of the spring 59, ready to perform its function when the succeeding loop-carrier comes along with the next tie. The trip arms 56, are made double and connected by a cross-piece 61½.

62, represents a cross-piece connecting the brackets 58, which limits the outward movement of the outer end of the trip bar, and thus limits the inward movement of the inner end of the same. The brackets 58, may be moved along the frame 48, if desired, so as to discharge the bale tie at a later or earlier period in order to form a shorter or longer tie.

63, represents a flat spring which holds the switch 51, normally in the position shown in Fig. III, allowing said switch to fly back as the loop-carrier comes forward, leaving a passage-way, whereby the same may be switched off in its backward travel.

I claim as my invention—

1. In a bale tie machine, the combination of a counting device; a rack for receiving the completed ties, said rack being provided with heads having peripheral projections; a pivoted lever engaging said heads and projections, and means in connection with said counting device for moving said lever out of engagement with said projections; substantially as described and for the purpose set forth.

2. In a machine for making bale ties, the combination of a rotatable disk; a series of projections on said disk, and a movable arm carried by a shaft traveling in the path of said projections and suitable means for rotating said shaft in order to rotate said disk, and thus ascertain the number of ties manufactured; substantially as described.

3. In a machine for making bale ties, the combination of a rotatable disk; a shaft having an arm; means for rotating said shaft and arm; projections on said disk with which said arm engages; a rack for receiving the ties; a pivoted lever for controlling the revolution of said rack; a projection on said lever, and an arm on said disk which comes in contact with said projection on each revolution of the disk; substantially as and for the purpose set forth.

4. In a machine for making bale ties, the combination of a rack having a central shaft with curved radial arms; a head on said rack having squared faces and projections; a pivoted lever extending in the pathway of said head, and means in connection with said machine for automatically moving said lever and permitting said rack to rotate; substantially as and for the purpose set forth.

5. In a machine for making bale ties, the combination of a loop carrier having a pin for carrying the loop of the bale tie; a beveled projection on said loop carrier; and trip arms situated in the path of said loop carrier with which said beveled projection comes in contact in order to discharge the bale tie therefrom; substantially as described and for the purpose set forth.

6. In a machine for making bale ties, the combination of a loop carrier having a pin for the reception of the looped end of a bale tie; a beveled portion on said loop carrier; trip arms situated in the pathway of said loop carrier having a beveled end, and a spring for automatically holding said trip arms in the pathway of said loop carrier; substantially as and for the purpose described.

WILLIAM A. LAIDLAW.

Witnesses:
  JAS. E. KNIGHT,
  F. E. MULLETT.